Patented Dec. 21, 1948

2,456,721

UNITED STATES PATENT OFFICE 2,456,721

CATALYST MANUFACTURE

Thomas H. Milliken, Jr., Moylan, Pa., and Irving H. Welinsky, Claymont, Del., assignors to Houdry Process Corporation, Wilmington, Del., a corporation of Delaware No Drawing. Application October 2, 1945, Serial No. 619,896

11 Claims. (Cl. 252—259)

The present invention relates to new and improved methods for the preparation of gel type catalysts containing silicon and zirconium compounds.

Catalysts comprising silica and zirconia have been proposed for use in processes involving cracking or other conversion of hydrocarbons, some of which have shown promising results. Such catalysts, however, exihbit erratic variations in physical properties and activity as well as in other performance characteristics, despite attempted duplication of procedure in methods of preparation and processing.

Among the objects of the present invention, therefore, are to provide methods for the production of superior silica-zirconia catalysts of the gel type, assuring improved uniformity in reproduction and regularity in performance.

We have discovered that by proper selection and control of conditions and procedure in drying of the plural hydrogel of silica and zirconia and the factors activating and governing the aging thereof, catalysts can be prepared therefrom of desired and controlled activity and physical and performance characteristics, which catalysts are capable of being readily reproduced.

In the inorganic gel art confusion has arisen with respect to the meaning of various terms. Accordingly, in this specification, the following terms have the meanings here stated. The term "gel" includes coagulated colloidal liquids as well as gelatinous precipitates in either wet or dry state and is generic to the terms hereinafter defined. A "hydrogel" is any true gel or gelatinous precipitate in its moist state before drying to the point that a rigid structure is produced. A "dried gel" is the product of drying any hydrogel to the point that a rigid gel structure is obtained. In this state the gel usually has a sandy or glassy appearance. A "wet dried gel" is a dried gel to which water or hydrogel is added, and has generally the appearance of wet sand or wet clay.

Plural hydrogels can be prepared from silicon and zirconium compounds in a number of different ways. Solutions of a soluble silicate and of a zirconium sale such as zirconium sulfate or an alkali zirconium carbonate, for instance ammonium zirconium carbonate, may be commingled under conditions to effect precipitation of a hydrogel of the two. Alternatively, separate hydrogels of silica and of zirconia may be prepared and mixed in the moist undried hydrogel state. Again, a hydrogel of one of these may be prepared and dispersed in a solution of the other and the latter percipitated upon the dispersed hydrogel. If desired, a hydrogel of one may be impregnated with a solution of the other, followed by hydrolysis of the material in solution. Any other desired mode of preparation resulting in a hydrogel embodying the specified two components may be employed.

For the best results with respect to the stability of catalytic activity in use, the gel should be treated to effect substantially complete removal of alkali metal compounds. This may be accomplished by thoroughly washing the gel with water, and, if desired, also with solutions of such materials as ammonium salts or zirconium salts to displace the component alkali metal cations from the gel. This purification treatment may be conducted at any time prior to the calcination of the gel at high temperature. Thus, if silica hydrogel is initially prepared from sodium silicate, the sodium component may be removed from the silica hydrogel prior to compositing with the zirconium compound. Likewise, the alkali metal cations may be removed from the hydrogels of the two in mixture. It is preferred, however, to purify the product after it has been dried, since the washing and other steps for the removal of alkali metal component can be more readily accomplished when the product is in the dried gel state. The purification to remove alkali metal compounds should preferably be carried to the point that the gel is substantially free of detectable alkali metal components, or to about less than 0.3% of alkali metal salts.

In accordance with the present invention a hydrogel, such as one obtained by any of the above-described methods, is subjected to controlled accelerated aging in the unpurified or purified state. The precise chemical and physical effects of aging are not definitely known. One of the observed effects produced by aging is a decrease in the gel particle density. It is at present believed that the aging also effects hydrolysis of any neutral zirconium salt which is present and similarly causes hydrolysis of any partially basic zorconium salt to a more basic zirconium salt or to zirconium hydroxide. Although, based on observed manifestations, it is believed that such hydrolysis does occur, the present invention is not limited to this theory inasmuch as the extent of hydrolysis in such a hydrogel at any particular time cannot readily be determined by presently available scientific methods.

Various methods may be employed to effect accelerated aging of the hydrogel. The aging action may be accomplished, for instance, by maintaining the hydrogel in a heated atmosphere in the presence of water vapor for a predetermined period, prior to its being brought to the dried gel state. This can be done readily by steaming the hydrogel for the required period followed by rapid drying. Since the hydrogel at the time of initiating aging contains a substantial amount of water, the effects of aging can also be obtained by subjecting the wet hydrogel to a heated atmosphere and controlling conditions to maintain the hydrogel in the wet state for the required aging time before actual drying takes place. The results of the treatments at elevated temperature are in accord with the theory that hydrolysis is occurring, since the rate of hydrolysis of compounds, generally, increases with increasing temperature. The aging action can be effected or modified by controlling the pH of the hydrogel, as by the addition of ammonium hydroxide, a shorter period being required for aging to occur under these conditions. For practical purposes, however, in order to maintain suitable control of conditions it is preferred to effect aging by subjecting the hydrogel for the required time to a heated atmosphere in the presence of added water to decelerate and regulate the rate of evaporation. By suitably controlling the factors governing the extent of aging of the hydrogels from which they are prepared, catalysts of predetermined activity and other performance characteristics can be produced in accordance with our invention. These factors include the time, temperature, water vapor content, etc., and are mutually dependent; for instance, it will be readily understood that less time would be required to obtain a desired aging effect as the temperature is increased. The intensity of aging, as hereinafter referred to, therefore, has reference to the correlated combined effect of these factors.

The designation of activity of a catalyst as herein employed has reference to the percent by volume of gasoline obtainable in testing the catalyst on cracking of a light gas oil. The standard test employed is that described in "Laboratory Methods for Determining the Activity of Cracking Catalysts," by J. Alexander and H. G. Shimp, page R–537, National Petroleum News, Technical Section, August 2, 1944. In this test, as an index of activity, the volume percent of gasoline (410° F. end point) produced from the charge is measured, as well as the weight percent of coke deposited on the catalyst and the weight percent of gas formed. This method is known as the "Cat-A" test, and numerical percentages recited hereinafter, unless otherwise identified, have reference to this test.

Based on a large number of silica-zirconia catalysts prepared from hydrogels, we have found that as the intensity of aging of the hydrogel is increased, the activity of the catalyst in terms of gasoline yield increases until a point or region is reached at which the catalyst demonstrates its maximum activity. Further aging beyond said maximum is followed by a decline in catalytic activity. On the other hand, when the hydrogel is aged beyond maximum activity for the resulting catalyst, the tendency for the catalyst to produce coke also decreases, so that by proper control of the degree of aging both up to the region of maximum activity and to a limited extent beyond, catalysts of superior performance characteristics can be obtained, from the standpoint of increased gasoline yields, improved gasoline to coke ratio, or reduced coke make. The region of maximum activity is considered as including gasoline yields of 2 to 5% lower than maximum. The advantage of catalysts prepared from hydrogels which have been aged to about the region of maximum activity will be readily apparent. Catalysts of the type described, which have been aged under appropriate conditions to beyond maximum activity have been found particularly suitable for use in cracking of heavy stocks as set forth in our copending application Ser. No. 619,897, filed of even date herewith.

We have also found that there is a positive relationship between the degree of aging required to attain maximum activity and the pH of the hydrogel. A series of hydrogels were prepared of varied pH in the range from 2.5 to over 7, and rapid drying of each was initiated without the hydrogel being previously submitted to an accelerated aging treatment. The drying was accomplished by circulating hot air through the hydrogel placed on perforate trays so that any aging that incidentally took place during the drying of the hydrogel to the dried gel state was minimized. In a series of tests on catalysts prepared from such rapidly dried hydrogels, it was found that catalysts of comparatively higher activity were obtainable from gels of pH around 6, whereas catalysts prepared from hydrogels in the pH range of 2.5 to about 5.5, and rapidly dried under the stated conditions to minimize aging, evidenced lower activity. For instance, catalysts prepared from hydrogels in the pH range of about 2.5 to 4.0, and dried under the above conditions produced less than 15% gasoline (by the "Cat-A" test), while with similarly treated hydrogels at pH of about 6, catalysts producing gasoline yields of over 40% are obtainable. Catalysts prepared from hydrogels of pH above 7, give less than 40% gasoline.

Catalysts at pH of about 6 and above, when subjected to accelerated aging in the hydrogel state show a decline in activity. On the other hand, the activity of catalysts prepared from hydrogels of pH below 6 can be increased by suitable aging of the hydrogel previous to its being dried, and in this manner catalysts showing an activity of over 40% gasoline can be obtained therefrom. Such aging of the hydrogel of lower pH can be continued until the limit of maximum activity of a catalyst prepared therefrom is reached, or to the desired extent beyond.

For proper control of the degree of aging of the hydrogel to obtain the desired physical and performance characteristics of the catalysts prepared therefrom, it is necessary to discontinue the aging action at the particular point or region appropriate to the activity desired in order to prevent further aging. This can be accomplished by reducing the water content of the hydrogel to an extent sufficient to produce a rigid structure, which occurs generally when the water content of the gel goes below about 60% by weight. Although possibly some changes might take place on further drying after the dried gel state has been reached, such changes would be so slow as to be comparatively negligible.

As noted above, a certain amount of aging may occur during the drying of the wet hydrogel at elevated temperature. The extent of such aging will depend upon the conditions prevailing in the oven or other apparatus, and can be varied by proper control of such factors as temperature, humidity, air circulation, etc. For instance, with a drier having imperforate trays upon which the gel is placed during drying, the degree of aging will also depend upon the thickness of the bed of gel. Thus, when a layer of hydrogel is dried, the gel on the surface may be dried rapidly and aged a minimum amount, but the gel within the layer continues to age until drying progresses to the point of sufficient reduction of water content, as for instance when the gel assumes a rigid state. Since the time that is required for drying varies with the thickness of the layer, the extent of aging obtained, therefore, varies accordingly. To obtain the required effect of controlled aging incident to the drying operation, the temperature and other conditions must be regulated so that the hydrogel is not too rapidly dried. Slow drying can be effected, for instance, by blowing heated air or other gas at a temperature of about 200–210° F. parallel to the imperforate trays containing the hydrogel as a fairly thick layer, for example over an inch in thickness.

As has been heretofore indicated the degree of aging required to obtain maximum activity is governed by the pH of the hydrogel. For instance, hydrogels in the pH range, below about 5.5, require an appropriate period or degree of aging for the production of catalysts of maximum activity therefrom; those in the pH range approximately between 5.5 and 7 produce catalysts of maximum activity without extended aging other than that incidentally occurring in rapid drying, such as during a period of not more than 1½ or 2 hours at 200°–240° F.

The maximum activity of silica-zirconia gel type catalysts, when properly prepared from hydrogels of pH below 7, is above 40% gasoline as measured by the test hereinbefore described. By appropriate selection and control of hot aging conditions these can be reduced in activity to a desired extent of below 40% as in the range of 20% to 38% gasoline, with concomitant decrease of potential coke making qualities, particularly when employed in cracking of a heavy stock.

In the formation of hydrogels in accordance with our preferred procedure, as for instance by the reaction of an alkali metal silicate and a soluble zirconium compound, alkali metal or other soluble salts are also formed. In addition thereto salts such as those of ammonium or alkali metals, may have been added or formed in buffering or neutralizing the reactants or the reaction product. These salts are undesirable in the final finished catalyst and should be removed. Volatile salts such as ammonium salts offer no problem since they are driven off in subsequent drying and calcination, but the removal from the gel of non-volatile salts, such as the alkali metal salts, requires a purification procedure such as heretofore described. As heretofore indicated, although the purification may precede drying, it is preferred to defer purifying until after drying to the dried gel state, for the additional reason that the presence of certain salts in the hydrogel accelerate aging. The presence of ammonium salts during aging and drying is particularly advantageous in this regard.

The dried gel may be worked up into any desired catalyst form. Thus, if it is to be employed as a powdered catalyst in suspension, the dried gel is ground to a powder which may be introduced into a cracking plant and calcined during regeneration if not already calcined prior to use. It may likewise be ground, made into a paste, and the paste formed into pieces of desired shape and size by extruding, casting, or the like, the pieces being dried and also preferably calcined at a temperature above 800° F. to develop the hardness of the pieces, prior to introduction into the cracking plant. In the event that catalyst pieces are formed from a paste, as described, it is preferred to mix the powder with water or hydrogel for a time sufficient for the production of a paste which can be handled in the forming equipment. The shaped pieces of catalyst can also be prepared by grinding the dried gel to a powder and pelleting the powder under pressure.

The following examples are given to illustrate several specific embodiments of the present invention:

*Example I*

A solution was prepared containing 62.55 parts by weight of "N-Brand" silicate, 12.72 parts of anhydrous sodium sulfate and 52.68 parts of water, which solution had a specific gravity of 1.278. A second solution was prepared containing 16.2 parts by weight of zirconium sulfate (Zircotan), 6.12 parts of 96.5% sulfuric acid, 12.72 parts of anhydrous sodium sulfate and 82.0 parts of water, which solution had a specific gravity of 1.167. The solutions were mixed in equal volumes to form a sol, which set to a gel in about fifteen minutes, and after 90 minutes was hard enough for easy granulation. The gel, which showed a pH of about 3.7, was granulated and then aged in a drying oven for sixty minutes at 200° F. on the wet bulb and 210°–220° F. dry bulb, followed by rapid drying with circulation of air therethrough in another oven at 240° F. The dried gel was then washed with water and ammonium chloride solutions and dried under reduced draft at 210° F. Thereafter the gel was ground, mixed with water and cast into pellets, which were calcined at a temperature of 1400° F. for ten hours in the presence of 5% steam. The catalyst so prepared produced an average yield of 46% gasoline when tested on cracking a light gas oil by the method hereinbefore identified.

The advantage of properly controlled accelerated aging is illustrated by the following comparison:

*Example II*

A solution was prepared which contained 62.55 parts by weight of "N-Brand" silicate, 12.72 parts of anhydrous sodium sulfate, and 86.98 parts of water, which solution had a specific gravity of 1.278. A second solution was prepared which contained 16.2 parts by weight of zirconium sulfate, 6.58 parts of 96.5% sulfuric acid, 12.72 parts of anhydrous sodium sufate, and 86.98 parts of water, which solution had a specific gravity of 1.223. The two solutions were mixed in equal volumes and the reaction product set to a gel which had a pH of 2.7. After 24 hours standing at room temperature, the gel was divided into two batches, one of which was subjected to aging in a drying oven for 2 hours at a wet bulb temperature of 200° F. and dry bulb temperature of 220° F. Both batches of gel were then dried at 240° F. with circulating air in 90 minutes. Both batches of dried gel were finished as catalyst as described in Example I. Both catalysts were tested by the identified standard procedure. The catalyst produced from the gel which was aged at high temperature for 2 hours produced a yield of 41% by volume of gasoline, whereas the catalyst prepared from the gel not so aged produced a yield of but 8% gasoline.

*Example III*

A solution was prepared which contained 31.4 parts by weight of "N-Brand" silicate and 25 parts of water, which solution had a specific gravity of 1.182. A second solution was prepared which contained 7.72 parts by weight of zirconium sulfate, 2.35 parts of 96% sulfuric acid, and 43.4 parts of water, which solution had a specific gravity of 1.069. The two solutions were mixed in equal volumes to form a sol which set to gel in about 4 seconds, having a pH of 6.1. The gel in layers of less than an inch in thickness was arranged on perforated trays and placed in the oven within about 15 minutes after setting. It was held in the oven for about 90 minutes at 240° F., air being rapidly circulated through the trays, and the gel thereby aged and dried. After washings with water and ammonium chloride solution, the gel was dried in about an hour at 200° F. under reduced draft. The dry product was ground, formed into pellets, and calcined as stated in Example I. The catalyst so formed showed an average yield of 42% gasoline in the standard test.

A catalyst prepared from a hydrogel of the same pH, following an identical procedure, but in addition being subjected to aging by steaming for one hour in the hydrogel state, showed an activity of 35.6% gasoline.

The following examples illustrate the preparation of catalysts from hydrogels aged to beyond maximum activity.

Example IV

A solution was prepared containing 62.55 parts by weight of "N-Brand" silicate, and 12.72 parts of anhydrous sodium sulfate in 52.7 parts of water; the obtained product had a specific gravity of 1.278. A second solution was prepared from 16.2 parts by weight of zirconium sulfate (Zircotan), 12.72 parts of anhydrous sodium sulfate and 5.90 parts of 96.5% sulfuric acid in 82.2 parts of water. The two solutions were mixed in equal volumes and a firm gel set therefrom in a few minutes, which had a pH of about 3.9–4.0. After standing for 45 minutes at room temperature the gel was granulated and placed on trays in a drying oven at an average temperature of 210° F. dry bulb 200° F. wet bulb for seventy-five minutes, followed by rapid drying. Catalyst pellets were prepared therefrom following the procedure outlined in Example I. Tested on cracking of a light gas oil by the method described, this catalyst showed an excellent gasoline to coke ratio, with 33.9% yield of gasoline and only 1.8% by weight of coke deposited.

Example V

A solution was prepared containing 142.5 parts by weight of "N-Brand" silicate (3.3 mols silica per mol of sodium oxide) and 61.2 parts of water which solution had a specific gravity of 1.25. A second solution was prepared which contained 34.14 parts by weight zirconium sulfate, 6.75 parts sulfuric acid (96.5%) and 10.44 parts glacial acidic acid and 77.4 parts of water, which solution had a specific gravity of 1.122. A third solution was prepared which contained 42.3 parts by weight of ammonium sulfate and 129 parts of water which solution had a specific gravity of 1.141. The three solutions were mixed continuously and formed a hydrogel in about 1.5 minutes which had a pH of 5.3. The hydrogel was subjected to aging and drying under conditions of reduced evaporation over a period of 16 hours. The dried gel was washed with water, treated with ammonium chloride solution, and again washed with water till the wash water was free of chloride ions. The wet dried gel was dried at 200 to 210° F. After drying, the gel was ground in a ball mill, formed into a paste by mixing with water, and the paste cast as pellets, which were dried and calcined at 1400° F. for 5 hours in a mixture of 6.5% water vapor and 93.5% air. When tested by the described method, this catalyst produced a gasoline yield of 34.3% and deposited 1.3% by weight of coke.

The above hydrogel would be aged in about eight hours under the given conditions to produce a catalyst within the region of maximum activity.

Although aging can be effected by the use of 100% steam or hot air saturated with water vapor, in practical operation it is preferred to employ temperatures in the range of 170° to 220° F. with wet bulb temperatures of about 10° F. lower than the dry bulb. (These conditions correspond to about 68% to 84% relative humidity, as appears from the tables in Lange's Handbook of Chemistry, 5th edition, 1944, pp. 1410–11.) A silica-zirconia hydrogel of pH 2.7 aged under conditions corresponding to a dry bulb temperature of 210° F. and a wet bulb reading of 200° F. (82% relative humidity) is aged within the region of maximum gas yield of catalyst produced therefrom, by a treatment under the stated conditions of about 120 to 150 minutes followed by rapid drying. Under the same treating conditions a hydrogel of pH 3.7 is aged to an approximately corresponding extent in about 60 minutes, while a hydrogel of pH 4.5 can be aged to within the region of maximum gasoline yield in 45 minutes or slightly less. Hydrogels of pH below 2.7 would require treatment under the stated conditions of not less than about 180 minutes. To obtain the effect of aging beyond the points of maximum activity, it will be readily understood, that a longer period of time will be required under the given treating conditions. For instance, hydrogels of about 2.7 pH may be treated under the conditions above described for more than 150 minutes and up to about 3 hours or somewhat longer; hydrogels of about 3.7 pH may be aged from over 60 to about 120 minutes or somewhat longer to obtain the effect of aging beyond maximum activity.

We claim as our invention:

1. The process of preparing a catalyst which comprises forming an acid hydrogel of silica and zirconia in the pH range of 2.5 to about 6, subjecting the hydrogel to accelerated aging to a controlled extent in an atmosphere maintaining a moisture content of not less than 68% relative humidity under conditions including temperature in the range of 170–220° F., for a period within the range of about 45 minutes to three hours, then subjecting the hydrogel to rapid drying conditions effecting thereby moisture removal to abate further substantial aging, the recited rapid drying being continued until the hydrogel is brought to dried gel state.

2. The process of claim 1 wherein said acid hydrogel is formed at about 2.7 pH and the aging conditions are selected within the defined range as to temperature and humidity so as to correspond in intensity to 82% relative humidity at a temperature of about 210° F. and said conditions are maintained for no less than about 120 minutes.

3. The process of claim 1 wherein said acid hydrogel is formed at about 2.7 pH and the aging conditions are selected within the defined range as to temperature and humidity so as to correspond in intensity to 82% relative humidity at a temperature of about 210° F. and said conditions are maintained for not less than about 150 minutes.

4. The process of claim 1 wherein said acid hydrogel is formed at about 3.7 pH and the aging conditions are selected within the defined range as to temperature and humidity so as to correspond in intensity to 82% relative humidity at a temperature of about 210° F. and said conditions are maintained for no less than about 60 minutes.

5. The process of claim 1 wherein said acid hydrogel is formed at about 3.7 pH and the aging conditions are selected within the defined range as to temperature and humidity so as to correspond in intensity to 82% relative humidity at a temperature of about 210° F. and said conditions are maintained for no less than about 90 minutes.

6. The process of preparing a catalyst useful in the cracking of petroleum hydrocarbons, which comprises forming a plural hydrogel of silica and zirconia at a pH in the range of about 2.5 to 5.5, subjecting the hydrogel to a heated atmosphere for a period of 45 minutes to about 3 hours at a temperature in the range of 170–220° F. under controlled conditions to effect aging of said hydrogel, said controlled conditions including maintaining an atmosphere of not less than about 68% relative humidity for the period during which aging of the hydrogel is being effected, the conditions of time and temperature being selected as determined by the particular pH of the hydrogel being treated, the lower the pH the more extended the time, subjecting the thus aged hydrogel to rapid drying conditions whereby a dried gel is obtained without thereby extending substantially the aging of the hydrogel incident to drying, forming the obtained dried gel into pieces and calcining said pieces at temperatures above 800° F.

7. The process in accordance with claim 6 wherein the conditions of time, temperature, and humidity during aging of the hydrogel are selected to provide an extent of aging at least that sufficient to impart to the dried and calcined catalyst prepared therefrom an activity within the region of maximum activity as measured by gasoline yield in cracking of a light gas oil in contact with said catalyst.

8. The process in accordance with claim 6 wherein the conditions of time, temperature, and humidity during aging of the hydrogel are selected to provide an extent of aging beyond that sufficient to impart to the dried and calcined catalyst prepared therefrom an activity within the region of maximum activity as measured by gasoline yield in cracking of a light gas oil in contact with said catalyst.

9. The process of making a catalyst which comprises preparing at a pH of 2.5 to about 5.5 a plural hydrogel from an alkali metal silicate and a soluble compound of zirconium, aging said hydrogel to an extent determined by its particular pH, the lower the pH the more extended the aging, said aging being effected by subjecting the hydrogel to a heated atmosphere and at a temperature of 200–210° F. in tne presence of moisture maintained in said atmosphere during the effective aging period of net less than 45 minutes, the effective aging period being followed by a drying period which abates further substantial aging as a result of reduction in water content of the hydrogel to below about 60% by weight, said effective aging period being at least sufficient in duration to thereby modify the characteristics of the hydrogel such that the dried and calcined gel obtained therefrom has materially enhanced catalytic activity over that of a similarly prepared hydrogel of the same pH which is dried and calcined without aging of the hydrogel beyond that incidental to rapid drying of the hydrogel during a period of not more than 1½ to 2 hours at 200–240° F.

10. The process of preparing a catalyst which comprises coprecipitating a hydrogel of about 5.3 pH from solutions of an alkali metal silicate and a zirconium salt in the presence of a buffer, subjecting said hydrogel to a heated wet atmosphere at a temperature in the order of 200°–210° F. under conditions such that more than eight hours are required to dry the gel to rigidity, maintaining the hydrogel in said atmosphere for at least the time indicated, washing the obtained dried gel to remove alkali metal components, drying the purified product, forming the same into pieces and drying and calcining the pieces at temperatures above 800° F.

11. The process which comprises reacting an alkali metal silicate and zirconium sulfate under acid conditions and in the presence of an ammonium salt to form a sol setting to a hydrogel of pH about 5.3, aging said hydrogel in the presence of a maintained moist atmosphere during an effective aging period and drying the hydrogel, said aging and drying being accomplished by subjecting the hydrogel to a temperature of 200° to 210° F. for not less than 8 hours, removing alkali metal salt from the obtained dried gel by steps including washing, drying the resulting product, forming the same into pieces, and calcining the pieces at a temperature in excess of 800° F.

THOMAS H. MILLIKEN, JR.
IRVING H. WELINSKY.

REFERENCES CITED

The following references are of record in the file of this patent:

UNITED STATES PATENTS

| Number | Name | Date |
| --- | --- | --- |
| 1,772,055 | Miller et al. | Aug. 5, 1930 |
| 2,283,173 | Bates | May 19, 1942 |
| 2,289,918 | Lee et al. | July 14, 1942 |
| 2,387,596 | Marisic | Oct. 23, 1945 |
| 2,412,958 | Bates | Dec. 24, 1946 |

OTHER REFERENCES

Mellor, Comprehensive Treatise on Inorganic and Theoretical Chemistry, vol. 7, page 130.